United States Patent
Kim et al.

(10) Patent No.: US 11,866,623 B2
(45) Date of Patent: Jan. 9, 2024

(54) CONDUCTIVE POLYMER COMPOSITE FOR ADHESION TO FLEXIBLE SUBSTRATE AND METHOD FOR PREPARING SAME

(71) Applicant: KOREA INSTITUTE OF SCIENCE AND TECHNOLOGY, Seoul (KR)

(72) Inventors: Heesuk Kim, Seoul (KR); Youngpyo Ko, Seoul (KR); Min Park, Seoul (KR); Sang-Soo Lee, Seoul (KR); Jeong Gon Son, Seoul (KR); Jong Hyuk Park, Seoul (KR); Seungjun Chung, Seoul (KR); Tae Ann Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 810 days.

(21) Appl. No.: 16/460,237

(22) Filed: Jul. 2, 2019

(65) Prior Publication Data

US 2020/0181463 A1   Jun. 11, 2020

(30) Foreign Application Priority Data

Dec. 7, 2018 (KR) .................. 10-2018-0156923

(51) Int. Cl.
*C09J 9/02* (2006.01)
*C08K 3/04* (2006.01)
(Continued)

(52) U.S. Cl.
CPC .......... *C09J 9/02* (2013.01); *C08K 3/041* (2017.05); *C08K 3/042* (2017.05); *C08K 3/045* (2017.05); *C09J 183/04* (2013.01); *C08K 2003/085* (2013.01); *C08K 2003/0806* (2013.01); *C08K 2003/0812* (2013.01); *C08K 2003/0843* (2013.01); *C08K 2003/0856* (2013.01);
(Continued)

(58) Field of Classification Search
CPC ......................................... C09J 9/02
See application file for complete search history.

(56) References Cited

U.S. PATENT DOCUMENTS

| | | | |
|---|---|---|---|
| 2009/0014691 A1* | 1/2009 | Kint | C01B 33/44 523/202 |
| 2019/0292418 A1* | 9/2019 | Xiang | H01L 31/0512 |
| 2020/0337640 A1* | 10/2020 | Jeon | A61B 5/25 |

FOREIGN PATENT DOCUMENTS

| KR | 10-2013-0015544 A | 2/2013 |
|---|---|---|
| KR | 10-1269650 B1 | 5/2013 |
| KR | 10-1600446 B1 | 3/2016 |

OTHER PUBLICATIONS

SYLGARD 184 Product Information (Year: 2022).*
SYLGARD 184 Product Specification (Year: 2022).*

* cited by examiner

*Primary Examiner* — William D Young
(74) *Attorney, Agent, or Firm* — Rabin & Berdo, P.C.

(57) ABSTRACT

A conductive polymer composite for adhesion to a flexible substrate contains a polymer adhesive containing a curable polymer and a curing agent; and a conductive filler containing a metal and a carbonaceous material dispersed in the polymer adhesive. The conductive polymer composite is suitable for application to not only the human body but also other objects having irregular surface. In addition, due to enhanced adhesive strength of the conductive polymer composite to the flexible substrate, the reduction in conductivity or conductivity breakdown caused by external stress can be prevented and flexibility and stretchability can be improved.

12 Claims, 3 Drawing Sheets (51) Int. Cl.
  *C09J 183/04*     (2006.01)
  *C08K 3/08*       (2006.01)
(52) U.S. Cl.
  CPC ............... *C08K 2003/0862* (2013.01); *C08K 2003/0881* (2013.01); *C08K 2003/0887* (2013.01); *C08K 2201/001* (2013.01); *C09J 2467/006* (2013.01); *C09J 2475/006* (2013.01); *C09J 2479/086* (2013.01); *C09J 2483/006* (2013.01)

FIG. 1

Example 4

Example 5

Example 6

Comparative Example 5

Comparative Example 6

Comparative Example 7

CONDUCTIVE POLYMER COMPOSITE FOR ADHESION TO FLEXIBLE SUBSTRATE AND METHOD FOR PREPARING SAME

CROSS-REFERENCE TO RELATED APPLICATIONS

This application claims, under 35 U.S.C. § 119, the priority of Korean Patent Application No. 10-2018-0156923 filed on Dec. 7, 2018 in the Korean Intellectual Property Office, the disclosure of which is incorporated herein by reference in its entirety.

TECHNICAL FIELD

The present disclosure relates to a conductive polymer composite for adhesion to a flexible substrate and a method for preparing the same, more specifically to a conductive polymer composite for adhesion to a flexible substrate, which exhibits superior electrical characteristics and improved adhesion on the flexible substrate and has flexibility and stretchability, and a method for preparing the same.

BACKGROUND

Mechanical flexibility has become an important trend in the current electronic products. It is for intimacy with the human body and application to various designs. For example, a circuit may be designed or packaged to have a complex shape for application to flexible displays, flexible transistors, various sensors, solar cells, flexible semiconductors, etc. Such flexible electronic devices may have a number of requirements for connection of their constituent materials. In addition to superior conductivity, grounding characteristics and electrical properties useful for easy signal transmission, excellent physical properties and adhesive properties are required. As an adhesive, a polymer material may have a wide range of mechanical properties through molecular designing and may have improved electrical conductivity through the addition of various conductive fillers.

In the current conductive adhesive applications, epoxy exhibiting strong shrinkage phenomenon is mostly used as a matrix. However, the existing epoxy-based electrically conductive adhesives have been limited in application to flexible electronic products due to their high rigidity. In addition, they fail to provide conductivity and reliability on flexible substrates which are utilized a lot in the research of flexible electronics because of poor adhesion.

REFERENCES OF RELATED ART

Patent Documents

Korea Patent Laid-Open Publication No. 10-2013-0015544.
Korea Patent Registration No. 10-1600446.

SUMMARY

The present disclosure is directed to providing a conductive polymer composite for adhesion to a flexible substrate, which prevents reduction in conductivity or conductivity breakdown caused by external stress and exhibits improved flexibility and stretchability by improving adhesion on the flexible substrate.

Furthermore, the present disclosure is directed to providing a variety of flexible electronic devices such as a flexible display, a flexible transistor, a flexible sensor, a solar cell, etc. with improved conductivity and improved electrical characteristics with minimized conductivity breakdown caused by external stress, by providing flexibility and stretchability at the same time by forming a conductive polymer adhesive film on a flexible substrate using the conductive polymer adhesive of the present disclosure.

According to an aspect of the present disclosure, there is provided a conductive polymer composite for adhesion to a flexible substrate, which contains: a polymer adhesive containing a curable polymer and a curing agent; and a conductive filler containing a metal and a carbonaceous material dispersed in the polymer adhesive.

The polymer adhesive may have a mixture viscosity of 3000 mPa·s to 5000 mPa·s before curing.

The polymer adhesive may have a bulk tensile strength of 0.1 to 10 MPa after curing.

The polymer adhesive may have a volume shrinkage ratio of 1 to 10% after curing.

The content of the conductive filler may be 100 to 500 parts by weight based on 100 parts by weight of the polymer adhesive.

The polymer adhesive may be at least one selected from a silicone-based resin, a urethane-based resin, an acrylic resin, an isoprene-based resin, a chloroprene-based resin, a fluorine-based resin, butadiene rubber and styrene-butadiene rubber.

The polymer adhesive may be a silicone-based resin.

The polymer adhesive may contain 10 to 120 parts by weight of the curing agent based on 100 parts by weight of the curable polymer.

The metal may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir).

Specifically, the metal may be at least one selected from gold (Au), silver (Ag) and copper (Cu).

Even more specifically, the metal may be silver (Ag).

The metal may be at least one selected from a group consisting of a metal particle having a diameter of 100 to 200 nm, a metal particle having a diameter of 1 to 4 μm, and a metal particle having a diameter of 5 to 10 μm.

Specifically, the metal may be a mixture of a metal particle having a diameter of 100 to 200 nm, a metal particle having a diameter of 1 to 4 μm, and a metal particle having a diameter of 5 to 10 μm.

The carbonaceous material may be at least one selected from single-walled carbon nanotube, multi-walled carbon nanotube, graphene, graphite, carbon black, carbon fiber and fullerene.

The carbon material may be at least one selected from single-wall carbon nanotube and multi-walled carbon nanotube.

The carbonaceous material may be multi-walled carbon nanotube having a diameter of 15 to 40 nm and a length of 10 to 50 μm.

The conductive filler may contain 0.1 to 2 parts by weight of the carbonaceous material based on 100 parts by weight of the metal.

The flexible substrate may be a substrate containing any one selected from a silicone-based resin, a urethane-based resin, polyimide (PI), polyethylene terephthalate (PET), polyethylene naphthalate (PEN) and polytetrafluoroethylene (PTFE).

The flexible substrate may be a substrate containing a silicone-based resin containing polydimethylsiloxane (PDMS).

The conductive polymer adhesive may be used as an electrode on the flexible substrate.

The conductive polymer adhesive may be used as an electrode on a silicon substrate.

The conductive polymer adhesive may be one having flexibility and stretchability.

According to another aspect of the present disclosure, there is provided a method for preparing a conductive polymer composite for adhesion to a flexible substrate, which includes:

(a) a step of preparing a conductive filler dispersion by dispersing a metal and a carbonaceous material in an organic solvent;

(b) a step of preparing a mixture of a conductive filler and a polymer adhesive by mixing a curable polymer and a curing agent with the conductive filler dispersion and then removing the solvent;

(c) a step of forming an adhesive mixture coating layer by coating the mixture of a conductive filler and a polymer adhesive on a flexible substrate; and (d) a step of forming a conductive polymer composite on the flexible substrate by curing the adhesive mixture coating layer.

The metal of the step (a) may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir).

Specifically, the metal may be at least one selected from gold (Au), silver (Ag) and copper (Cu).

The metal may be at least one selected from a group consisting of a metal particle having a diameter of 100 to 200 nm, a metal particle having a diameter of 1 to 4 µm, and a metal particle having a diameter of 5 to 10 µm.

Specifically, the metal may be a mixture of a metal particle having a diameter of 100 to 200 nm, a metal particle having a diameter of 1 to 4 µm, and a metal particle having a diameter of 5 to 10 µm.

The carbonaceous material of the step (a) may be at least one selected from single-walled carbon nanotube, multi-walled carbon nanotube, graphene, graphite, carbon black, carbon fiber and fullerene.

The carbon material may be at least one selected from single-wall carbon nanotube and multi-walled carbon nanotube.

The carbonaceous material may be multi-walled carbon nanotube with a diameter of 15 to 40 nm and a length of 10 to 50 µm.

In the step (a), 0.1 to 2 parts by weight of the carbonaceous material may be dispersed in the organic solvent based on 100 parts by weight of the metal.

The organic solvent of the step (a) may be at least one selected from chloroform, toluene, ethanol, methanol, dichloromethane and tetrahydrofuran.

The dispersion in the step (a) may be carried out by simultaneously proceeding ultrasonic grinding and stirring processes.

In the step (b), 10 to 120 parts by weight of the curing agent may be mixed based on 100 parts by weight of the curable polymer.

In the step (b), the content of the conductive filler may be 100 to 500 parts by weight based on 100 parts by weight of the adhesive polymer containing the curable polymer and the curing agent.

The mixing of the step (b) may be carried out by simultaneously proceeding stirring and degassing processes.

The drying of the step (b) may be performed by a magnetic stirrer.

In the step (c), the flexible substrate may be a substrate containing any one selected from a silicone-based resin, a urethane-based resin, polyimide (PI), polyethylene terephthalate (PET), polyethylene naphthalate (PEN) and polytetrafluoroethylene (PTFE).

The flexible substrate may be a substrate containing a silicone-based resin containing polydimethylsiloxane (PDMS).

The coating of the step (c) may be carried out according to any one of the methods selected from a doctor blade method, a flat screen method, a spin coating method, roll coating, flow coating, gravure printing and flexographic printing.

The thickness of the adhesive mixture coating layer in the step (c) may be from 10 to 200 µm.

The curing of the step (d) may be conducted for 60 to 120 minutes at 150 to 200° C.

Most specifically, in the step (a), the metal may be a mixture of silver (Ag) particles having a diameter of 100 to 200 nm, silver (Ag) particles having a diameter of 1 to 4 µm and silver (Ag) particles having a diameter of 5 to 10 µm, the carbonaceous material may be multi-walled carbon nanotube with a diameter 15 to 40 nm and a length of 10 to 50 µm, and 0.1 to 2 parts by weight of the carbonaceous material may be dispersed in chloroform based on 100 parts by weight of the metal, in the step (b), 10 to 120 parts by weight of the curing agent may be mixed based on 100 parts by weight parts of the curable polymer, 100 to 500 parts by weight of the conductive filler may be mixed based on 100 parts by weight of the polymer adhesive containing the curable polymer and the curing agent, and the mixing may be carried out by simultaneously proceeding stirring and degassing processes, in the step (c), the flexible substrate may be a silicon film, and the coating may be performed by a doctor blade method to form an adhesive mixture coating layer with a thickness of 10 to 200 µm, and the curing process of the step (d) may be carried out at 150 to 200° C. for 60 to 120 minutes.

According to a further another aspect of the present disclosure, there is provided a flexible electronic device containing the conductive polymer composite for adhesion to a flexible substrate.

The flexible electronic device may be any one selected from a flexible display, a flexible transistor, a flexible sensor and a solar cell.

A conductive polymer composite for adhesion to a flexible substrate of the present disclosure provides the effect of preventing reduction in conductivity or conductivity breakdown caused by external stress by improving adhesion on the flexible substrate.

In addition, there is an effect that a conductive polymer adhesive film formed on a flexible substrate by using the conductive polymer composite of the present disclosure can be applied to a variety of flexible electronic devices such as a flexible display, a flexible transistor, a flexible sensor, a solar cell, etc.

DETAILED DESCRIPTION OF EMBODIMENTS

Hereinafter, various aspects and exemplary embodiments of the present disclosure are described in more detail. Hereinafter, the exemplary embodiments of the present disclosure are described in detail with reference to accompanying drawings so that those of ordinary skill in the art to which the present disclosure belongs can easily carry out the present disclosure. However, the following description is not intended to limit the present disclosure to specific exemplary embodiments. When it is determined that there is a specific description of the related art in the following description of the present disclosure that may obscure the subject matter of the present disclosure, a detailed description thereof will be omitted.

The terms used herein are merely used to describe particular exemplary embodiments, and are not intended to limit the present disclosure. A singular expression includes plural forms unless the context clearly indicates otherwise. In this application, the terms "contain", "include" or "have" are used to specify that the features, numbers, steps, operations, elements or combinations thereof described in the specification are present, and the presence or addition of one or more other features, numbers, steps, operations, elements or combinations thereof are not intended to be precluded.

Hereinafter, a conductive polymer composite for adhesion to a flexible substrate of the present disclosure is described.

The conductive polymer composite for adhesion to a flexible substrate of the present disclosure contains: a polymer adhesive containing a curable polymer and a curing agent; and a conductive filler containing a metal and a carbonaceous material dispersed in the polymer adhesive.

The curable polymer may be a thermosetting polymer or a photo-curable polymer.

The polymer adhesive may contain specifically 10 to 120 parts by weight, more specifically 90 to 110 parts by weight, still more specifically 95 to 105 parts by weight, of the curing agent based on 100 parts by weight of the curable polymer.

Specifically, the polymer adhesive may have a mixture viscosity of 3000 mPa·s to 5000 mPa·s before curing, a bulk tensile strength of 0.1 to 10 MPa after curing, and a volume shrinkage of less than or equal to about 1-10%.

If the viscosity, bulk tensile strength and volume shrinkage ratio of the polymer adhesive are lower than the lower limit values or greater than the upper limit values, the adhesive strength, mechanical properties, electrical properties, etc. of the adhesive on the flexible substrate may be unsatisfactory.

Further, the conductive polymer composite for adhesion to a flexible substrate of the present disclosure may contain specifically 100 to 500 parts by weight of the conductive filler, more specifically 150 to 470 parts by weight of the conductive filler, further more specifically 200 to 420 parts by weight of the conductive filler, based on 100 parts by weight of the polymer adhesive containing the curable polymer and the curing agent.

When the content of the conductive filler is less than 100 parts by weight based on 100 parts by weight of the adhesive polymer, conductivity may not be achieved. And, when it exceeds 500 parts by weight, it is not preferable because the adhesive force on the flexible substrate may be reduced.

The polymer adhesive may be specifically at least one selected from a silicone-based resin, a urethane-based resin, an acrylic resin, an isoprene-based resin, a chloroprene-based resin, a fluorine-based resin, butadiene rubber and styrene-butadiene rubber. More specifically, it may be a silicon-based resin.

The metal may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir), Specifically, the metal may be at least one selected from gold (Au), silver (Ag) and copper (Cu). Even more specifically, it may be silver (Ag).

The metal may be one selected from a metal particle having a diameter of 100 to 200 nm, a metal particle having a diameter of 1 to 4 μm and a metal particle having a diameter of 5 to 10 μm. More specifically, it may be a mixture of a metal particle having a diameter of 100 to 200 nm, a metal particle having a diameter of 1 to 4 μm and a metal particle having a diameter of 5 to 10 μm.

The carbonaceous material may be specifically at least one selected from single-walled carbon nanotube, multi-walled carbon nanotube, graphene, graphite, carbon black, carbon fiber and fullerene. More specifically, the carbonaceous material may be at least one selected from single-walled carbon nanotube and multi-walled carbon nanotube. Even more specifically, the carbonaceous material may be multi-walled carbon nanotube having a diameter of 15 to 40 nm and a length of 10 to 50 μm.

The conductive filler may contain specifically 0.1 to 2 parts by weight, more specifically 0.15 to 1 part by weight, even more specifically 0.2 to 0.5 part by weight, of the carbonaceous material based on 100 parts by weight of the metal.

The conductive polymer adhesive may be used as an electrode on a flexible substrate.

The conductive polymer adhesive may be used as an electrode on a silicon substrate.

The conductive polymer adhesive has flexibility and stretchability.

Figure 1:
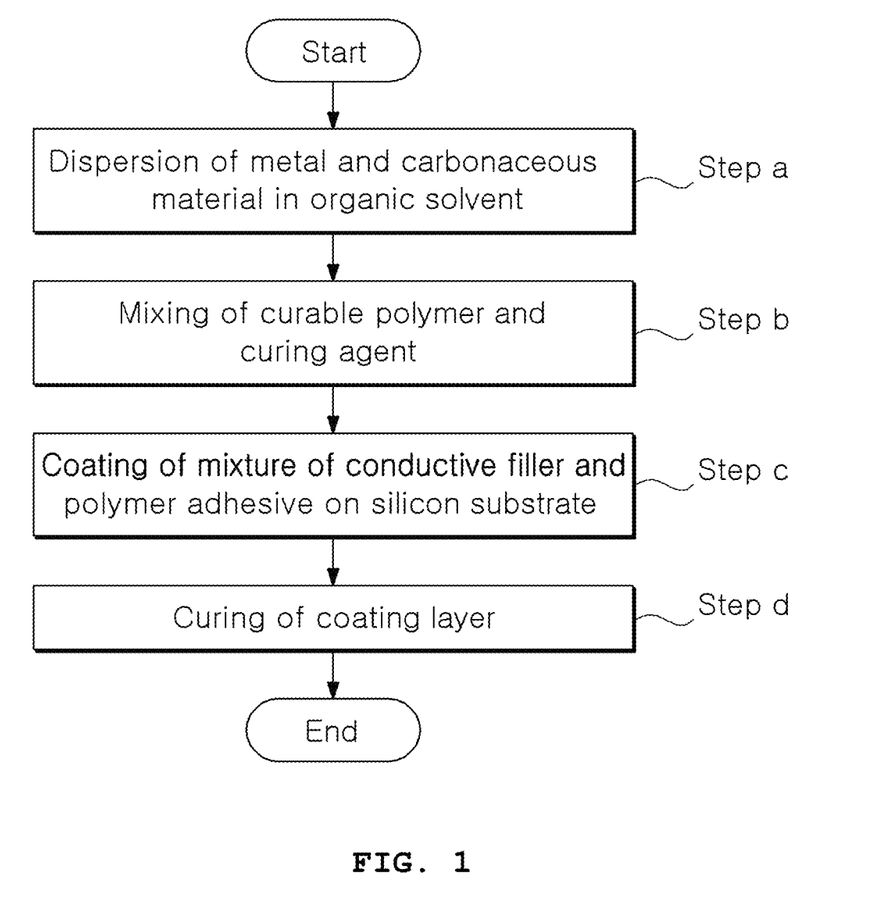
FIG. 1 is a flow diagram sequentially illustrating a method for preparing a conductive polymer composite for adhesion to a flexible substrate of the present disclosure.

FIG. 1 is a flow diagram sequentially illustrating a method for preparing a conductive polymer composite for adhesion to a flexible substrate of the present disclosure. Hereinafter, the method for preparing a conductive polymer composite for adhesion to a flexible substrate of the present disclosure will be described with reference to FIG. 1.

First, a conductive filler dispersion is prepared by dispersing a metal and a carbonaceous material in an organic solvent (step a).

The metal may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir), Specifically, the metal may be at least one selected from gold (Au), silver (Ag) and copper (Cu). Even more specifically, it may be silver (Ag).

The metal may be one selected from a metal particle having a diameter of 100 to 200 nm, a metal particle having a diameter of 1 to 4 μm and a metal particle having a diameter of 5 to 10 μm. More specifically, it may be a mixture of a metal particle having a diameter of 100 to 200 nm, a metal particle having a diameter of 1 to 4 μm and a metal particle having a diameter of 5 to 10 μm.

The carbonaceous material may be specifically at least one selected from single-walled carbon nanotube, multi-walled carbon nanotube, graphene, graphite, carbon black, carbon fiber and fullerene. More specifically, the carbonaceous material may be at least one selected from single-walled carbon nanotube and multi-wall carbon nanotube. Even more specifically, the carbonaceous material may be multi-walled carbon nanotube having a diameter of 15 to 40 nm and a length of 10 to 50 μm.

The conductive filler may contain specifically 0.1 to 2 parts by weight, more specifically 0.15 to 1 part by weight, even more specifically 0.2 to 0.5 part by weight, of the carbonaceous material based on 100 parts by weight of the metal.

The organic solvent may be specifically at least one selected from chloroform, toluene, ethanol, methanol, dichloromethane and tetrahydrofuran. More specifically, it may be chloroform. Chloroform can facilitate the dispersion of the polymer adhesive and the conductive filler and, at the same time, can facilitate the drying of the organic solvent.

The conductive filler may be dispersed easily by proceeding ultrasonic grinding and stirring processes simultaneously.

Then, a mixture of a conductive filler and a polymer adhesive is prepared by mixing the conductive filler dispersion with a curable polymer and a curing agent and then removing the solvent (step b).

The polymer adhesive may contain specifically 10 to 120 parts by weight, more specifically 90 to 110 parts by weight, still more specifically 95 to 105 parts by weight, of the curing agent based on 100 parts by weight of the curable polymer.

Further, the content of the conductive filler may be specifically 100 to 500 parts by weight, more specifically 150 to 470 parts by weight, still more specifically 200 to 420 parts by weight, based on 100 parts by weight of the polymer adhesive containing the curable polymer and the curing agent.

The mixing may be specifically carried out by simultaneously proceeding stirring and degassing processes.

The drying may be performed by a magnetic stirrer.

Next, an adhesive mixture coating layer is formed by coating the mixture of the conductive filler and the polymer adhesive on a flexible substrate (step c).

The flexible substrate may be specifically a substrate containing any one selected from a silicone-based resin, a urethane-based resin, polyimide (PI), polyethylene terephthalate (PET), polyethylene naphthalate (PEN) and polytetrafluoroethylene (PTFE). More specifically, it may be a substrate containing a silicone-based resin containing polydimethylsiloxane (PDMS).

The coating may be performed by a doctor blade method, a flat screen method, a spin coating method, roll coating, flow coating, gravure printing and flexographic printing. Specifically, it may be performed by a doctor blade method.

The thickness of the adhesive mixture coating layer may be specifically 10 to 200 μm, more specifically 50 to 150 μm, even more specifically 90 to 110 μm. When the thickness of the adhesive mixture coating layer is less than 10 μm, the electrical conductivity of the finally formed conductive polymer adhesive film may be not sufficient. And, when it exceeds 200 μm, processing time may increase during subsequent drying or curing treatment and the finally prepared conductive polymer adhesive film may have reduced flexibility.

Finally, a conductive polymer composite is filmed on a flexible substrate by curing the adhesive mixture coating layer (step d).

The curing treatment may be conducted specifically for 60 to 120 minutes at 150 to 200° C., more specifically for 80 to 100 minutes at 160 to 190° C.

Specifically, the curing treatment may be performed after the adhesive mixture coating layer is formed on the flexible substrate and then dried. Accordingly, the finally prepared conductive polymer composite may have uniform electrical properties and improved adhesivity.

The present disclosure provides a flexible electronic device containing the conductive polymer composite for adhesion to a flexible substrate.

The flexible electronic device may be a flexible display, a flexible transistor, a flexible sensor, a solar cell, etc. However, the scope of the present disclosure is not limited thereto and it may be applied to a variety of electronic devices that require flexibility and stretchability.

In particular, although not explicitly described in the following examples, the conductive polymer composite for adhesion to a flexible substrate according to the present disclosure was prepared by varying the kind and form of the metal and the carbonaceous material, the compositional ratio of the metal and the carbonaceous material and the kind of the organic solvent in the step (a), the compositional ratio of the conductive filler and the polymer adhesive in the step (b), the kind of the substrate, the method of coating the mixture of the conductive filler and the polymer adhesive and the thickness of the coated adhesive mixture coating layer in the step (c), and the curing temperature and time conditions in the step (d).

The physical properties of the prepared conductive polymer composite for adhesion to a flexible substrate were confirmed by performing tests related to specific resistance, adhesive strength to a substrate and stretchability.

As a result, only when all of the following conditions were satisfied, unlike the other conditions and other numerical ranges, the adhesion of the conductive polymer adhesive film to the substrate was superior and improved electrical conductivity together with superior flexibility and stretchability was achieved, such that remarkable electrical properties and mechanical properties could be exerted when applied to a variety of flexible electronic devices.

In the step (a), the metal is a of mixture of (Ag) particles having a diameter of 100 to 200 nm, silver (Ag) particles having a diameter of 1 to 4 μm and silver (Ag) particles having a diameter of 5 to 10 μm, the carbonaceous material is multi-walled carbon nanotube having a diameter of 15 to 40 nm and a length of 10 to 50 μm, and 0.1 to 2 parts by weight of the carbonaceous material based on 100 parts by weight of the metal is dispersed in chloroform, as one of a variety of organic solvents. In the step (b), 10 to 120 parts by weight of the curing agent is mixed based on 100 parts by weight of the curable polymer, 100 parts to 500 parts by weight of the conductive filler is mixed based on 100 parts by weight of the polymer adhesive containing the curable polymer and the curing agent, and the mixing is carried out by proceeding simultaneously stirring and degassing processes. In the step (c), the substrate is necessarily a flexible substrate, and the coating is performed by a doctor blade method to form the adhesive mixture coating layer with a thickness of 10 to 200 μm. In the step (d), the curing treatment is performed for 60 to 120 minutes at 150 to 200° C.

Hereinafter, the present disclosure is explained in more detail through examples, etc. In the followings, however, the examples, etc. should not be interpreted to reduce or limit the scope and content of the present disclosure. In addition, it is obvious that those of ordinary skill can easily carry out the invention based on the present disclosure including the following examples.

EXAMPLES

Example 1

(1) Preparation of mixture of polymer adhesive and silver (Ag)/multi-walled carbon nanotube Silver (Ag)/multi-walled carbon nanotube (1.86/0.01 g) dispersed in chloroform was mixed with a transparent two-component curable polymer adhesive consisting of 500 mg of a base resin and 500 mg of a curing agent at a ratio of 1:1. After completion of the reaction, a mixture of the polymer adhesive and the silver/multi-walled carbon nanotube was prepared by removing the chloroform used in the dispersion of the filler at room temperature (25° C.). As the silver (Ag), a mixture of silver (Ag) particles having diameters of 100 to 200 nm, 1 to 4 μm and 5 to 10 μm, mixed at a weight ratio of 1:1:1 was used. As the multi-walled carbon nanotube, one having an average diameter of 30 nm and an average length of 30 μm was used. The dispersion of the silver (Ag)/multi-walled carbon nanotube was carried out using an ultrasonic grinding device, and the mixing of the silver (Ag)/multi-walled carbon nanotube dispersed in chloroform and the matrix of the polymer adhesive was performed using a high-viscosity mixing/degassing device. The stirring and degassing processes were conducted at the same time.

(2) Formation of conductive polymer composite film on polydimethylsiloxane (PDMS) substrate A film with a thickness of about 100 μm was prepared on a polydimethylsiloxane (PDMS) substrate with a thickness of 1 mm by coating the composite of the polymer adhesive and the silver (Ag)/multi-walled carbon nanotube on the polydimethylsiloxane (PDMS) substrate. The prepared film was cured at 180° C. for 90 minutes.

Example 2

A conductive polymer adhesive film was prepared in the same manner as in Example 1, except that 2.33 g, instead of 1.86 g, of silver (Ag) was used.

Example 3

A conductive polymer adhesive film was prepared in the same manner as in Example 1, except that 3 g, instead of 1.86 g, of silver (Ag) was used.

Example 4

A conductive polymer adhesive film was prepared in the same manner as in Example 1, except that 4 g, instead of 1.86 g, of silver (Ag) was used.

Example 5

A conductive polymer adhesive film was prepared in the same manner as in Example 4, except that a polyimide (PI) film was used instead of the polydimethylsiloxane (PDMS) substrate.

Example 6

A conductive polymer adhesive film was prepared in the same manner as in Example 4, except that a polyethylene naphthalate (PEN) film was used instead of the polydimethylsiloxane (PDMS) substrate.

Comparative Example 1

(1) Preparation of mixture of polymer adhesive and silver (Ag)

1.86 g of silver (Ag) dispersed in chloroform was mixed with a transparent two-component thermosetting polymer adhesive consisting of 500 mg of a base resin and 500 mg of a curing agent at a ratio of 1:1. After completion of the reaction, a mixture of the polymer adhesive and silver (Ag) was prepared by removing the solvent used in the dispersion of the filler at room temperature (25° C.).

(2) Preparation of polymer adhesive-silver composite film on polydimethylsiloxane (PDMS) substrate A film with a thickness of about 100 μm was prepared on a polydimethylsiloxane (PDMS) substrate with a thickness of 1 mm by coating the composite of the polymer adhesive and silver on the polydimethylsiloxane (PDMS) substrate. The prepared film was cured at 180° C. for 90 minutes.

Comparative Example 2

A conductive polymer adhesive film was prepared in the same manner as in Comparative Example 1, except that 2.33 g, instead of 1.86 g, of silver (Ag) was used.

Comparative Example 3

A conductive polymer adhesive film was prepared in the same manner as in Comparative Example 1, except that 3 g, instead of 1.86 g, of silver (Ag) was used.

Comparative Example 4

A conductive polymer adhesive film was prepared in the same manner as in Comparative Example 1, except that 4 g, instead of 1.86 g, of silver (Ag) was used.

Comparative Example 5

(1) Preparation of conductive epoxy adhesive mixture

A commercially available two-component thermosetting conductive epoxy adhesive (ELCOAT A-200) consisting of a base resin and a curing agent at a ratio of 3:2, were mixed under stirring by proceeding stirring and degassing processes at the same time using a high-viscosity mixing/degassing device.

(2) Preparation of conductive epoxy adhesive film on polydimethylsiloxane (PDMS) substrate A film with a thickness of about 100 μm was prepared on a polydimethylsiloxane (PDMS) substrate with a thickness of 1 mm by coating the conductive epoxy adhesive mixture on the polydimethylsiloxane (PDMS) substrate. The prepared film was cured at 150° C. for 20 minutes.

Comparative Example 6

A conductive polymer adhesive film was prepared in the same manner as in Comparative Example 5, except that a polyimide (PI) film was used instead of the polydimethylsiloxane (PDMS) substrate.

Comparative Example 7

A conductive polymer adhesive film was prepared in the same manner as in Comparative Example 5, except that a polyethylene naphthalate (PEN) film was used instead of the polydimethylsiloxane (PDMS) substrate.

The components of the conductive polymer composites of Examples 1-6 and Comparative Examples 1-7 are compared and summarized in Table 1 below.

TABLE 1

| | | Conductive polymer adhesive | | | | | | |
|---|---|---|---|---|---|---|---|---|
| | Substrate | Base resin (mg) | Curing agent (mg) | Ag (g) | MWNT (g) | Base resin (parts by weight) | Curing agent (parts by weight) | Ag (parts by weight) | MWNT (parts by weight) |
| Example 1 | PDMS | 500 | 500 | 1.86 | 0.01 | 50 | 50 | 186 | 1 |
| Example 2 | PDMS | 500 | 500 | 2.33 | 0.01 | 50 | 50 | 233 | 1 |
| Example 3 | PDMS | 500 | 500 | 3 | 0.01 | 50 | 50 | 300 | 1 |
| Example 4 | PDMS | 500 | 500 | 4 | 0.01 | 50 | 50 | 400 | 1 |
| Example 5 | PI | 500 | 500 | 4 | 0.01 | 50 | 50 | 400 | 1 |
| Example 6 | PEN | 500 | 500 | 4 | 0.01 | 50 | 50 | 400 | 1 |
| Comp. Ex. 1 | PDMS | 500 | 500 | 1.86 | 0 | 50 | 50 | 186 | 0 |
| Comp. Ex. 2 | PDMS | 500 | 500 | 2.33 | 0 | 50 | 50 | 233 | 0 |
| Comp. Ex. 3 | PDMS | 500 | 500 | 3 | 0 | 50 | 50 | 300 | 0 |
| Comp. Ex. 4 | PDMS | 500 | 500 | 4 | 0 | 50 | 50 | 400 | 0 |
| Comp. Ex. 5 | PDMS | | | ELCOAT A-200 | | | | | |
| Comp. Ex. 6 | PI | | | ELCOAT A-200 | | | | | |
| Comp. Ex. 7 | PEN | | | ELCOAT A-200 | | | | | |

TEST EXAMPLES

Test Example 1: Measurement of Specific Resistance

The specific resistance of the conductive polymer composites attached onto the polydimethylsiloxane (PDMS) substrate according to Examples 1-4 and Comparative Examples 1-5 was measured using a surface resistance meter (Napson, CRESBOX). The result is shown in Table 2 below.

TABLE 2

| | Polymer adhesive content | Silver (Ag) content | Multi-walled carbon nanotube content | Specific resistance |
|---|---|---|---|---|
| Untreated group | 100 parts by weight | 0 parts by weight | 0 part by weight | — |
| Example 1 | 100 parts by weight | 186 parts by weight | 1 part by weight | — |
| Comp. Ex. 1 | 100 parts by weight | 186 parts by weight | 0 part by weight | — |
| Example 2 | 100 parts by weight | 233 parts by weight | 1 part by weight | $1.14 \times 10^{-3}$ |
| Comp. Ex. 2 | 100 parts by weight | 233 parts by weight | 0 part by weight | 5500 |
| Example 3 | 100 parts by weight | 300 parts by weight | 1 part by weight | $1.55 \times 10^{-4}$ |

TABLE 2-continued

| | Polymer adhesive content | Silver (Ag) content | Multi-walled carbon nanotube content | Specific resistance |
|---|---|---|---|---|
| Comp. Ex. 3 | 100 parts by weight | 300 parts by weight | 0 part by weight | $5.4 \times 10^{-3}$ |
| Example 4 | 100 parts by weight | 400 parts by weight | 1 part by weight | $1.22 \times 10^{-4}$ |
| Comp. Ex. 4 | 100 parts by weight | 400 parts by weight | 0 part by weight | $9.8 \times 10^{-3}$ |
| Comp. Ex. 5 | ELCOAT A-200 | | | $3.4 \times 10^{-3}$ |

It can be seen that the conductive polymer composites of Examples 1-4, which contain 1 part by weight of multi-walled carbon nanotube, exhibit significantly lower specific resistance values as compared to those prepared under the same conditions except for the carbon nanotube (Comparative Examples 1-4).

Test Example 2: Measurement of Adhesive Strength

Figure 2:
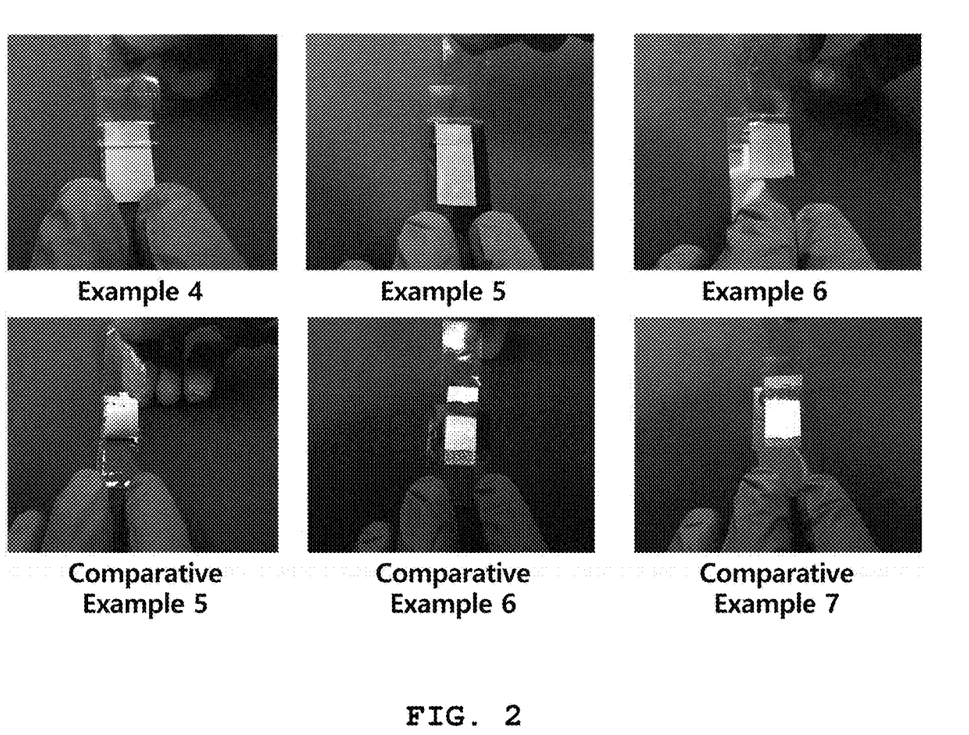
FIG. 2 shows photographs showing the adhesive force measurement results of Test Example 2.

The adhesive strength of the conductive polymer composites prepared in Examples 4-6 and Comparative Examples 5-7 was tested using a Scotch tape (Cat. #583D, 3M). The result is shown in FIG. 2.

It can be seen that the conductive polymer composite of Example 4 using a silicone-based resin exhibits remarkably superior adhesive strength as compared to the epoxy resin-based conductive adhesive of Comparative Example 5.

Test Example 3: Stretch Test

Figure 3:
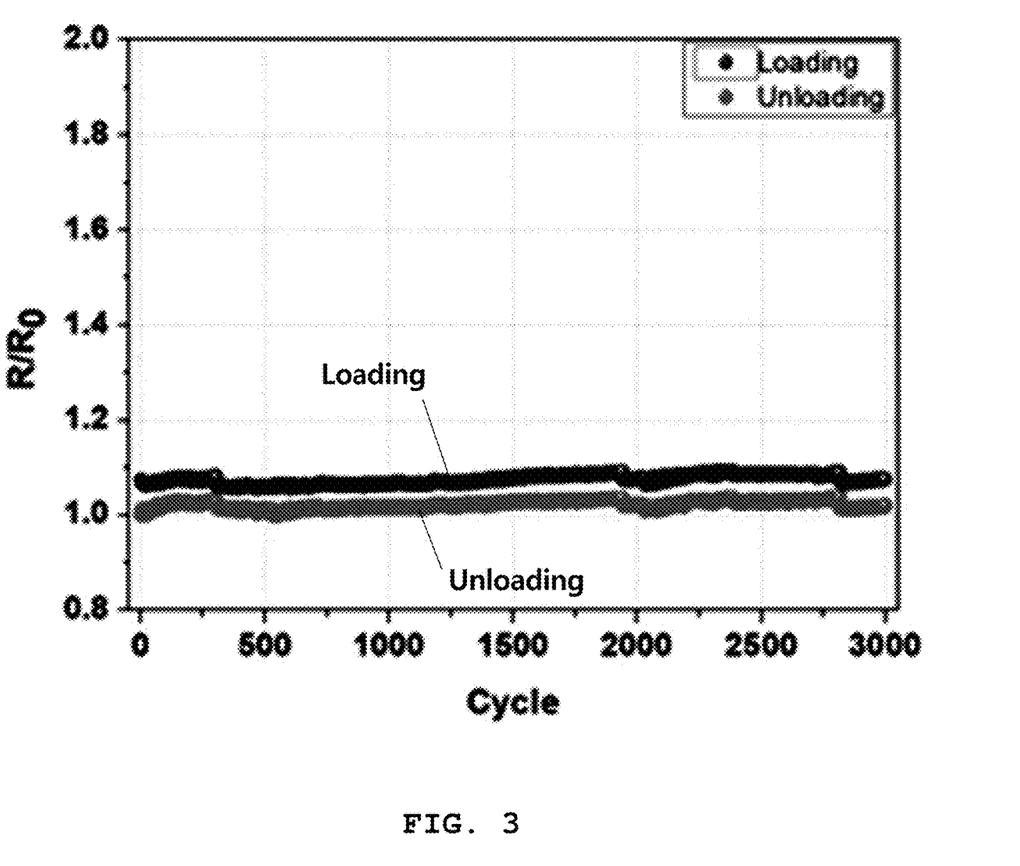
FIG. 3 shows the stretch test result of Test Example 3.

The conductive polymer composite of Example 3 prepared on the polydimethylsiloxane (PDMS) substrate was connected to a multimeter (6512, Keithley) and change in resistance was measured while repeatedly stretching by 30% of the initial length. The result is shown in FIG. 3.

It can be seen that the adhesive prepared using silver and multi-walled carbon nanotube and then cured on the polydimethylsiloxane (PDMS) substrate is stable without change in electrical properties even after being stretched.

Although the exemplary embodiments of the present disclosure have been described, those of ordinary skill in the art will be able to make various modifications and variations to the present disclosure through addition, changing, deletion, etc. within a range not departing from the spirit of the disclosure defined in the claims, and such modifications and variations are also included within the scope of the present disclosure.

What is claimed is:

1. A conductive polymer composite adhesive to a flexible substrate, comprising:
    a polymer adhesive comprising a curable polymer and a curing agent; and
    a conductive filler consisting of a metal and a carbonaceous material,
    wherein the metal and the carbonaceous material are dispersed in the polymer adhesive by using a chloroform,
    wherein the metal has a mixture of a first metal particle having a diameter of 100 to 200 nm, a second metal particle having a diameter of 1 to 4 μm, and a third metal particle having a diameter of 5 to 10 μm,
    wherein the carbonaceous material is a multi-walled nanotube,
    wherein the carbonaceous material is present in an amount of 0.1 to 2 parts by weight based on 100 parts by weight of the metal,
    wherein the conductive filler is present in an amount of 100 to 500 parts by weight based on 100 parts by weight of the polymer adhesive,
    wherein the flexible substrate comprises a polydimethylsiloxane (PDMS).

2. The conductive polymer composite for adhesion to a flexible substrate according to claim 1, wherein the polymer adhesive has a mixture viscosity of 3000 mPa·s to 5000 mPa·s before curing.

3. The conductive polymer composite for adhesion to a flexible substrate according to claim 1, wherein the polymer adhesive has a bulk tensile strength of 0.1 to 10 MPa after curing.

4. The conductive polymer composite for adhesion to a flexible substrate according to claim 1, wherein the polymer adhesive has a volume shrinkage ratio of 1 to 10% after curing.

5. The conductive polymer composite for adhesion to a flexible substrate according to claim 1, wherein the polymer adhesive is at least one selected from a silicone-based resin, a urethane-based resin, an acrylic resin, an isoprene-based resin, a chloroprene-based resin, a fluorine-based resin, butadiene rubber and styrene-butadiene rubber.

6. The conductive polymer composite for adhesion to a flexible substrate according to claim 1, wherein the polymer adhesive is a silicone-based resin.

7. The conductive polymer composite for adhesion to a flexible substrate according to claim 1, wherein the polymer adhesive comprises 10 to 120 parts by weight of the curing agent based on 100 parts by weight of the curable polymer.

8. The conductive polymer composite for adhesion to a flexible substrate according to claim 1, wherein the metal is at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir).

9. The conductive polymer composite for adhesion to a flexible substrate according to claim 1, wherein the multi-walled carbon nanotube has a diameter of 15 to 40 nm and a length of 10 to 50 μm.

10. The conductive polymer composite for adhesion to a flexible substrate according to claim 1, wherein the conductive polymer adhesive provides electrical conductivity as an electrode on the flexible substrate.

11. A flexible electronic device comprising the conductive polymer composite for adhesion to a flexible substrate according to claim 1.

12. The flexible electronic device according to claim 11, wherein the flexible electronic device is any one selected from a flexible display, a flexible transistor, a flexible sensor and a solar cell.

* * * * *